(12) United States Patent
Johnson et al.

(10) Patent No.: US 7,668,118 B2
(45) Date of Patent: *Feb. 23, 2010

(54) DIRECTIONAL TOPOLOGY DISCOVERY FOR DOWNHOLE NETWORKS

(75) Inventors: Monte Johnson, Orem, UT (US); Mark Stillings, Lehi, UT (US)

(73) Assignee: IntelliServ, Inc., Houston, TX (US)

( * ) Notice: Subject to any disclaimer, the term of this patent is extended or adjusted under 35 U.S.C. 154(b) by 253 days.

This patent is subject to a terminal disclaimer.

(21) Appl. No.: 12/019,865

(22) Filed: Jan. 25, 2008

(65) Prior Publication Data

US 2009/0190484 A1 Jul. 30, 2009

(51) Int. Cl.
*H04L 12/28* (2006.01)
*H04L 12/56* (2006.01)

(52) U.S. Cl. .................. 370/254; 370/389; 370/450

(58) Field of Classification Search .......... None
See application file for complete search history.

(56) References Cited

U.S. PATENT DOCUMENTS

| | | | | |
|---|---|---|---|---|
| 5,065,399 A | * | 11/1991 | Hasegawa et al. | 714/4 |
| 5,506,838 A | * | 4/1996 | Flanagan | 370/258 |
| 6,094,600 A | * | 7/2000 | Sharpe et al. | 700/19 |
| 6,704,283 B1 | * | 3/2004 | Stiller et al. | 370/238 |
| 6,973,028 B1 | * | 12/2005 | Huai et al. | 370/222 |
| 7,168,506 B2 | * | 1/2007 | Boucher et al. | 175/48 |
| 7,310,688 B1 | * | 12/2007 | Chin | 709/252 |
| 2005/0135360 A1 | * | 6/2005 | Shin et al. | 370/389 |
| 2006/0007863 A1 | * | 1/2006 | Naghian | 370/238 |
| 2006/0092856 A1 | * | 5/2006 | Mitsumori | 370/254 |
| 2006/0260797 A1 | * | 11/2006 | Hall et al. | 166/65.1 |
| 2006/0268688 A1 | * | 11/2006 | Isozu | 370/227 |
| 2008/0137556 A1 | * | 6/2008 | Park et al. | 370/255 |

* cited by examiner

*Primary Examiner*—Hong Cho
*Assistant Examiner*—Robert C Scheibel
(74) *Attorney, Agent, or Firm*—Victor Segura (57) ABSTRACT

An apparatus and method for discovering and monitoring a collection of nodes in a downhole network may include receiving data packets originating from several downhole nodes. These packets may be read to extract a unique identifier and hop count for each of the nodes. This information may then be used to create entries in a network topology table corresponding to each of the downhole nodes. Each entry may contain unique identifier identifying the respective node, a hop count identifying a location of the node within the downhole network, and a direction identifier. The method may further include modifying one or more entries in the topology table having a conflicting hop count and direction identifier.

25 Claims, 9 Drawing Sheets

| | GUID 404a | Hop Count 404b | Direction 404c | Time Last Received 404d | Node Status 404e |
|---|---|---|---|---|---|
| 402a → | 12 | 3 | Up | 1:01:01 | Active |
| 402b → | 3 | 2 | Up | 1:01:02 | Active |
| 402c → | 19 | 1 | Up | 1:01:01 | Active |
| 402d → | 7 | 1 | Down | 1:01:02 | Active |
| 402e → | 11 | 2 | Down | 1:01:02 | Active |

Fig. 4

| | GUID 404a | Hop Count 404b | Direction 404c | Time Last Received 404d | Node Status 404e |
|---|---|---|---|---|---|
| 402a → | 12 | 3 | Up | 1:01:01 | Active |
| 402b → | 3 | 2 | Up | 1:01:02 | Active |
| 402c → | 19 | 1 | Up | 1:01:01 | Active |
| 402d → | 7 | 1 | Down | 1:01:02 | Active |
| 402e → | 11 | 2 | Down | 1:00:30 | Inactive (Unexpected) —502 |

| GUID | Hop Count | Direction | Time Last Received | Node Status |
|---|---|---|---|---|
| 12 | 3 | Up | 1:00:50 | Inactive (Expected) |
| 3 | 2 | Up | 1:01:02 | Active |
| 19 | 1 | Up | 1:01:01 | Active |
| 7 | 1 | Down | 1:01:02 | Active |
| 11 | 2 | Down | 1:01:02 | Active |

402a → (row 1)
600a → (Inactive (Expected))

| GUID | Hop Count | Direction | Time Last Received | Node Status |
|---|---|---|---|---|
| 13 | 3 | Up | 1:01:02 | Active |
| 12 | 3 | Up | 1:01:01 | Active |
| 3 | 2 | Up | 1:01:02 | Active |
| 19 | 1 | Up | 1:01:01 | Active |
| 7 | 1 | Down | 1:01:02 | Active |
| 11 | 2 | Down | 1:01:02 | Active |

| GUID | Hop Count | Direction | Time Last Received | Node Status |
|---|---|---|---|---|
| 13 | 3 | Up | 1:01:02 | Active |
| ~~12~~ | ~~3~~ | ~~Up~~ | ~~1:01:01~~ | ~~Replaced~~ |
| 3 | 2 | Up | 1:01:02 | Active |
| 19 | 1 | Up | 1:01:02 | Active |
| 7 | 1 | Down | 1:01:02 | Active |
| 11 | 2 | Down | 1:01:02 | Active |

402f → (row 1), 402a → (row 2), 402b → (row 3), 402c → (row 4), 402d → (row 5), 402e → (row 6)

| GUID | Hop Count | Direction | Time Last Received | Node Status |
|---|---|---|---|---|
| 13 | 3 | Up | 1:01:02 | Active |
| 12 | 3 | Up | 1:01:01 | Unknown — 712 |
| 3 | 1 | Up | 1:01:02 | Active |
| 19 | 1 | Down | 1:01:02 | Active |
| 7 | 2 | Down | 1:01:02 | Active |
| 11 | 3 | Down | 1:01:02 | Active |

402f → (row 1), 402a → (row 2), 402b → (row 3), 402c → (row 4), 402d → (row 5), 402e → (row 6)

DIRECTIONAL TOPOLOGY DISCOVERY FOR DOWNHOLE NETWORKS

BACKGROUND OF THE INVENTION

1. Field of the Invention

This invention relates to downhole drilling and more particularly to apparatus and methods for managing and discovering network topology in a downhole drilling environment.

2. Description of the Related Art

The ability to transmit data at high speeds along a drill string is a current goal and project of the downhole drilling industry. More and better information at the surface has the ability to significantly decrease drilling costs by enabling operators to more accurately direct the drill string to hydrocarbon deposits. Such information may also improve safety and reduce the environmental impacts of drilling. This technology may also be desirable to take advantage of numerous advances in the design of tools and techniques for oil and gas exploration, and may be used to provide real-time access to data such as temperature, pressure, inclination, salinity, and the like, while drilling.

In order to transmit data at high speeds along a drill string, various approaches have been suggested. Very few approaches, however, have achieved commercial implementation due to the high costs of development and constraints imposed by the downhole environment. One approach that is currently showing promise is to incorporate a "network" of data transmission cable and other communication equipment into the drill string. Due to the length of drill strings, which may exceed 20,000 feet, this may require placing network "nodes" at selected intervals along the drill string. These nodes may act as repeaters to amplify the data signal and to provide points of data collection along the drill string.

Nevertheless, implementing and maintaining a network in a downhole environment is a difficult task. Unlike many conventional networks, the topology of a downhole network may be in a constant state of flux. That is, the number and positioning of nodes, as well as the status of each of the nodes may change frequently in the network. For example, nodes may be added or removed from the network at the surface either one or several at a time. In other cases, breaks may occur in transmission lines or other transmission components that may cause particular nodes or groups of nodes to temporarily or permanently lose communication with the surface. In other cases, the nodes themselves may temporarily or permanently cease to function. These characteristics make it a challenge to discover, monitor, and manage network components in a downhole environment.

In view of the foregoing, what is needed is an apparatus and method for discovering, monitoring, and managing network components in a downhole environment. Ideally, such an apparatus and method would provide an up-to-date view of network topology, identify network components and their position within the network, and identify the operating status of the components. Further needed is an apparatus and method to detect changes to network topology frequently or in real time. Yet further needed is an apparatus and method to perform each of the above functions while minimizing traffic on the network.

SUMMARY OF THE INVENTION

The present invention provides apparatus and methods for discovering and monitoring downhole network topology. The features and advantages of the present invention will become more fully apparent from the following description and appended claims, or may be learned by the practice of the invention as set forth hereinafter.

In a first aspect of the invention, a method for discovering and monitoring multiple nodes in a downhole network may include receiving data packets originating from several downhole nodes. These packets may be read to extract a unique identifier and hop count for each of the nodes. This information may then be used to create entries in a network topology table corresponding to each of the downhole nodes. Each entry may contain a unique identifier, a hop count, and a direction identifier. The method may further include modifying one or more entries in the topology table that have a hop count and direction identifier that matches the hop count and direction identifier of a more recently created or updated entry.

One or more actions may be taken in the event two or more entries have a matching hop count and direction identifier. For example, the older entry may be deleted from the topology table in order to eliminate the conflict. In other cases, a status indicator associated with the older entry and indicating an operating status of the corresponding node may be changed. For example, a status indicator may be changed to indicate that a node associated with an older entry has become inactive or its status has become unknown.

In selected embodiments, each of the entries may store the status indicator as well as a timestamp indicating the time the entry was created or last updated. In selected embodiments, the age of a timestamp may be used as the basis for changing the status of a particular node. For example, a node may transition from an active status to an inactive status, a known status to an unknown status, or the like, if a data packet is not received from a node within a specified amount of time.

In another aspect of the invention, a non-transitory computer-readable medium is disclosed to store a program of computer-executable instructions configured to perform operations to discover and monitor a collection of nodes in a downhole network. In selected embodiments, these operations may include receiving data packets originating from multiple downhole nodes and reading the packets to extract a unique identifier and hop count for each node. An entry for each node may be created in a network topology table to store the unique identifier, hop count, and a direction identifier. Operations may be included to modify one or more of the entries in the topology table that have a hop count and direction identifier that conflicts with the hop count and direction identifier of a more recently created or updated entry.

In another aspect of the invention, an apparatus is disclosed to discover and monitor a collection of nodes in a downhole network. The apparatus includes a non-transitory machine-readable medium storing executable and operational data structures. These data structures may include a network topology table maintained to monitor multiple nodes in a downhole network. The network topology table is configured to contain multiple entries, each corresponding to a node and storing a unique identifier, hop count, and direction identifier associated with the node. The network topology table is further configured such that no two entries have the same hop count and direction identifier.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
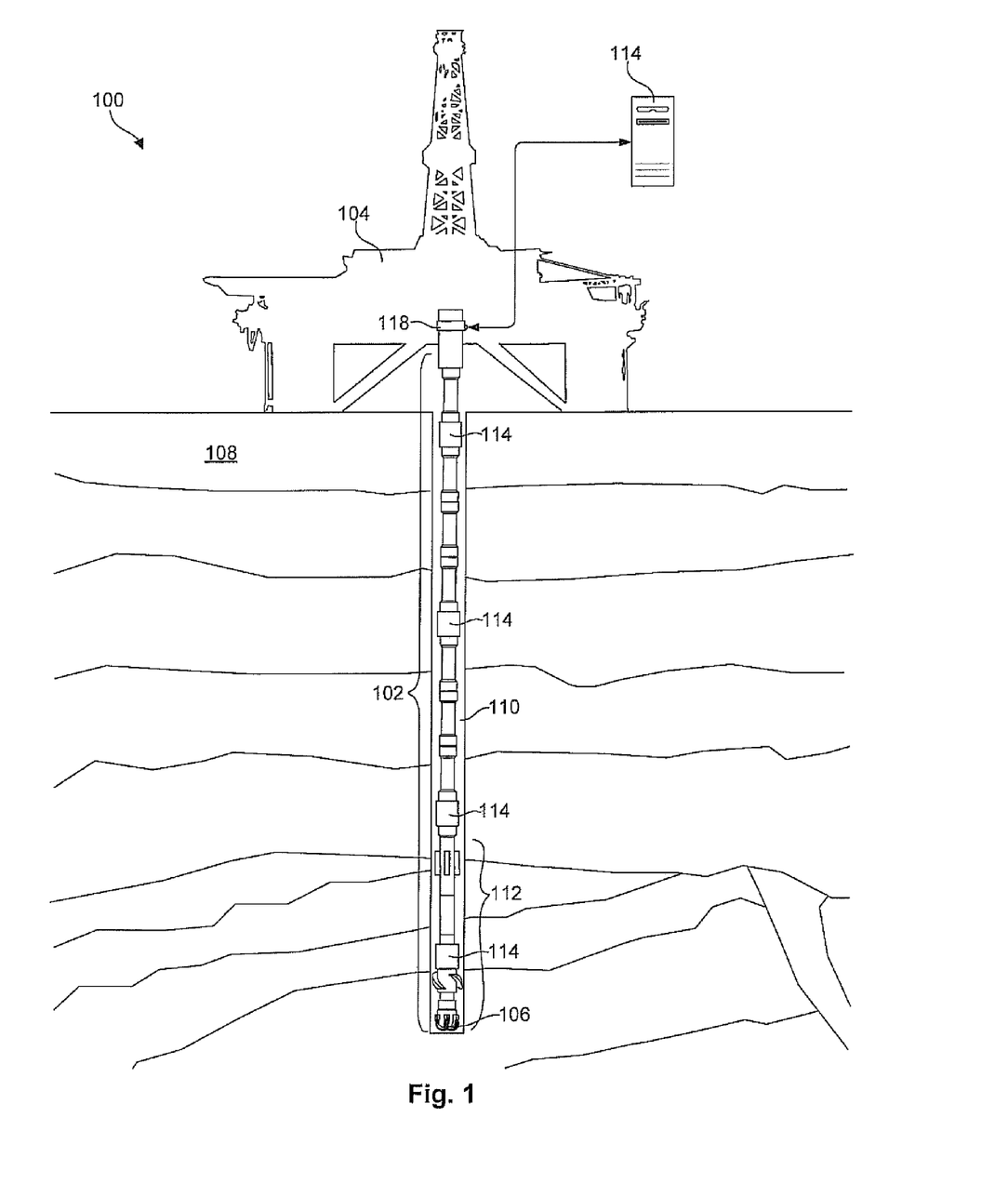
FIG. 1 is a high-level profile view of one embodiment of a drill string equipped with a downhole network in accordance with the invention.

Referring to FIG. 1, one embodiment of a downhole drilling system 100 for use with the present invention may include a drill string 102 comprising multiple sections of drill pipe and other downhole tools. The drill string 102 may be rotated by a drill rig 104 to turn a drill bit 106 that is loaded against the earth 108 to form a borehole 110. Rotation of the drill bit 106 may alternatively be provided by other downhole tools such as drill motors or drill turbines located adjacent to the drill bit 106.

The drill string 102 may include a bottom-hole assembly 112 which may include the drill bit 106 as well as sensors and other downhole tools such as logging-while-drilling ("LWD") tools, measurement-while-drilling ("MWD") tools, diagnostic-while-drilling ("DWD") tools, or the like. The bottom-hole assembly 112 may also include other downhole tools such as heavyweight drill pipe, drill collar, crossovers, mud motors, directional drilling equipment, stabilizers, hole openers, sub-assemblies, under-reamers, drilling jars, drilling shock absorbers, and other specialized devices, which are all well known in the drilling industry.

While drilling, a drilling fluid may be supplied under pressure at the drill rig 104 through the drill string 102. The drilling fluid may flow downhole through a central bore of the drill string 102 and then return uphole to the drill rig 104 through the annulus 110 between the borehole wall and the drill string 102. Pressurized drilling fluid may be circulated around the drill bit 106 to flush cuttings away from the drill bit 102 and carry them to the surface.

To transmit data along the drill string 102, a telemetry network comprising multiple network nodes 114 may be integrated into the drill string 102. These nodes 114 may be used as repeaters to boost a data signal at regular intervals as the signal travels along the drill string 102. The nodes 114 may also interface with various types of tools and sensors to provide points of data collection along the drill string 102.

In selected embodiments, the network may include a top node 114, such as a surface-based server, workstation, or other computing device, which may communicate with other nodes 114 along the drill string 102. In selected embodiments, a swivel device 118 may be used to transmit data signals between the stationary top node 114 and nodes 114 mounted to the rotating drill string 102. To transmit data between each of the nodes 114, data couplers and high-speed data cable may be incorporated into the drill pipe and other downhole tools that make up the drill string 102. In selected embodiments, the data couplers may be used to transmit data across the tool joint interfaces by induction and without requiring direct electrical contact therebetween.

Figure 2:
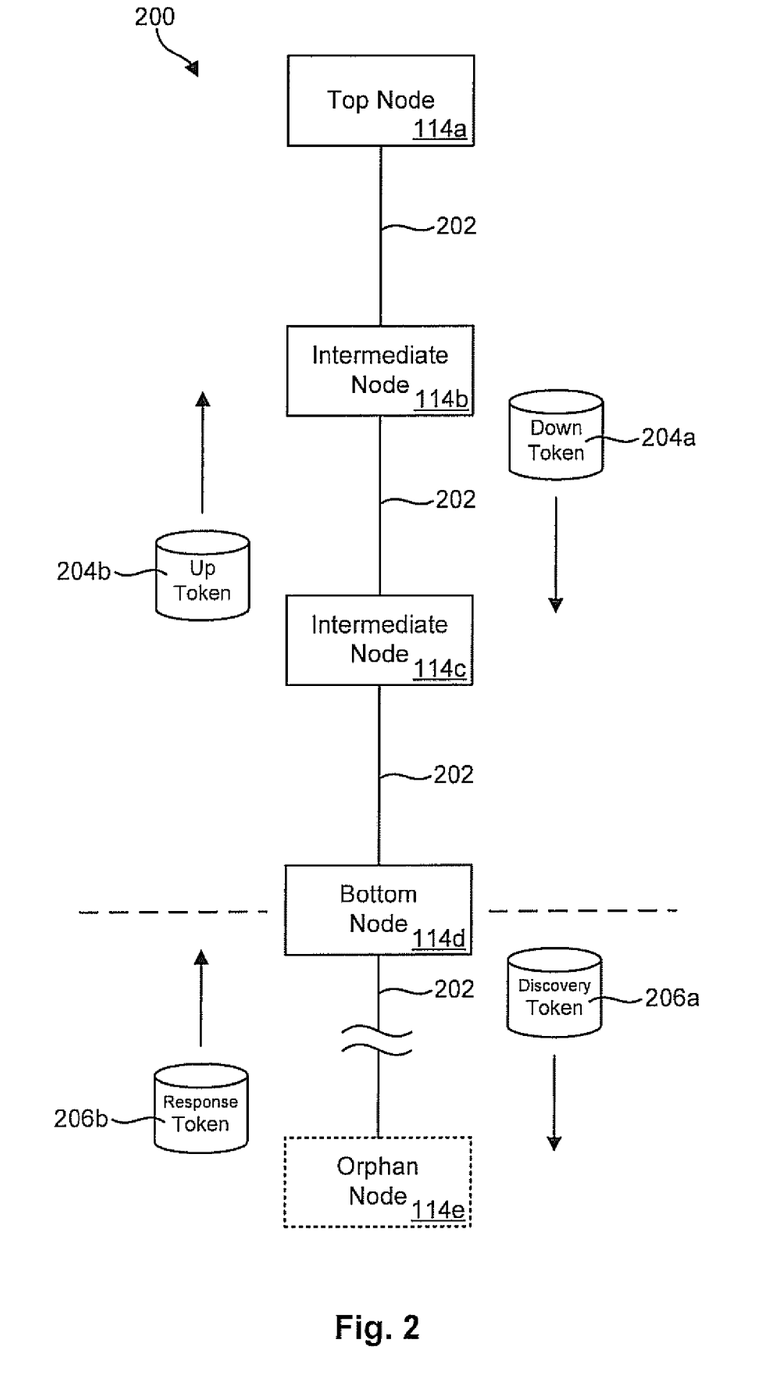
FIG. 2 is a high-level schematic block diagram of one embodiment of a token-passing protocol which may be employed by a downhole network in accordance with the invention.

Referring to FIG. 2, in selected embodiments, a downhole network 200 may generally include a top node 114a, one or more intermediate nodes 114b, 114c, and a bottom node 114d. As will be explained more fully hereafter, an orphan node 114e may include a node 114e that is not currently in communication with the network 200 but which may be connected at a future time if communication can be established. In certain embodiments, the nodes 114a-e may be connected together with network segments 202, providing a physically-segmented network 200. Thus, each node 114b, 114c with the exception of the end nodes 114a, 114d may connect to a network segment 202 immediately above and below the node 114b, 114c. Each segment 202 may include transmission cable, data couplers, or other physical hardware used to transmit data between each of the nodes 114a-d.

As will be explained in more detail hereafter, although the network may include multiple physically distinct segments, the network 200 may be configured to function as if the nodes 114a-d are connected to a common bus or segment 202. Thus, in selected embodiments, the segments 202 together may function as a "logical bus," which will become more evident from the following description.

In selected embodiments, each of the nodes 114a-e may be configured to function in accordance with one of various operational states depending on their position within the network 200. Stated otherwise, the top node 114a, intermediate nodes 114b, 114c, bottom node 114d, and orphan node 114e, may each function according to a distinct operational state. The nodes 114a-e may also be configured to transition between operational states under certain circumstances. For example, an orphan node 114e may transition to a bottom node and a bottom node 114d may transition to an intermediate node if communication can be established with the orphan node 114e. Likewise, if a bottom node 114d loses its connection with the network 200, the bottom node 114d may transition to an orphan node and the lowest intermediate node 114c may transition to a bottom node.

In certain embodiments, the nodes 114a-d may utilize a token-passing protocol to control how nodes 114a-d transmit data through the network 200. In general, a token may be generated which may be passed between the nodes 114a-d. This token authorizes the nodes 114a-d to transmit data onto the network 200, which functions as a "logical bus." Only a node 114a-d that possesses the token can transmit data onto the network 200. This token-passing protocol may prevent data collisions by ensuring that only one node is transmitting data onto the network 200 at any one time.

For example, a top node 114a may be configured to generate a down token 204a, which may be transmitted to an adjacent intermediate node 114b along with any "nodal data" the top node 114a has waiting. Nodal data may include data generated at a node, which may include data gathered from sensors or tools coupled to the node, or data generated by the node itself. The down token 204a may be received by an adjacent intermediate node 114b along with the nodal data from the top node 114a. This nodal data may be considered "received data" by the intermediate node 114b.

For purposes of this disclosure, the phrase "nodal data" may be used to describe data generated by a node 114a-d, whereas the phrase "received data" may be used to describe data received by a node 114a-d from another node 114a-d. Accordingly, "nodal data" generated by one node 114a-d may become "received data" once it is received by another node 114a-d. This distinction is important since the nodes 114a-d may, in certain embodiments, be configured to treat nodal data differently from received data.

For example, in certain embodiments, the nodes 114a-d, with the exception of the end nodes 114a, 114d, may be configured to transmit nodal data in both directions along the drill string 102. Thus, intermediate nodes 114b, 114c may be configured to transmit nodal data in both "up" and "down" directions along the drill string 102. Received data, on the other hand, may be transmitted in only one direction, namely, in a direction opposite the direction it originated from. Thus, a node 114b, 114c that receives data from a "down" direction may repeat it in an "up" direction and vice versa. This ensures that data will propagate along the network 200 without being duplicated repeatedly in both directions and slowing down the network with undesired traffic 200. The network 200 may function like a "logical bus" in that nodal data is propagated in both directions and is "seen" by every other node 114a-d on the network 200.

A further distinction is that while a node 114a-d may require a token to transmit nodal data onto the network 200, no such token may be needed to transmit received data. Thus, when an intermediate node 114b, 114c receives nodal data from another node 114a-d, which now becomes received data, it may immediately propagate the data along the network regardless of whether it has the token. This keeps data moving through the network while still preventing collisions by ensuring that nodes 114a-d are not transmitting nodal data onto the network at the same time.

Once the intermediate node 114b receives the down token 204a along with any nodal data transmitted by the top node 114a, the intermediate node 114b may claim the token by removing the token from the received data and then propagating the received data along the network 200. The intermediate node 114b may then transmit any nodal data it has waiting onto the network 200 along with the down token 204a. If the intermediate node 114b does not have nodal data to transmit, it may simply propagate the received data along with the down token 204a to the next node 114c. This node 114c may then follow a similar process.

Once the down token 204a reaches the bottom node 114d, the bottom node 114d may retire the down token 204a and generate an "up token" 204b. The up token 204b may be transmitted uphole along with any nodal data the bottom node 114d has waiting. In selected embodiments, the intermediate nodes 114b, 114c may not claim the up token 204b to transmit nodal data onto the network 200. Rather, the up token 204b may be used to notify the top node 114a that the down token 204a has been received and that it is safe to generate a new down token 204a. This ensures that two tokens are not circulating on the network 200 at the same time. In other embodiments, however, the intermediate nodes 114b, 114c may be authorized to transmit nodal upon receiving a down token 204a and an up token 204b, effectively giving the intermediate nodes 114b, 114c twice as many opportunities as the end nodes 114a, 114d to transmit nodal data onto the network 200.

In certain embodiments, the bottom node 114d may periodically transmit a discovery token 206a downhole in an attempt to reconnect to one or more orphan nodes 114e, if they exist. For example, in selected embodiments, the bottom node 114d may periodically transmit a discovery token 206a downhole after it receives the down token 204a but before it transmits the up token 204b. If the bottom node 114d receives a response token 206b from the orphan node 114e, this may indicate that communication has been reestablished with the orphan node 114e. If this occurs, the bottom node 114d may forward the down token 204a to the orphan node 114e and transition to an intermediate node. Similarly, the orphan node 114e may receive the down token 204a and transition to become the new bottom node. The new bottom node (i.e., the orphan node 114e) may then transmit an up token 204b in the "up" direction along with any nodal data it may have. In this manner, orphan nodes 114e may be reintegrated into the network 200.

Figure 3:
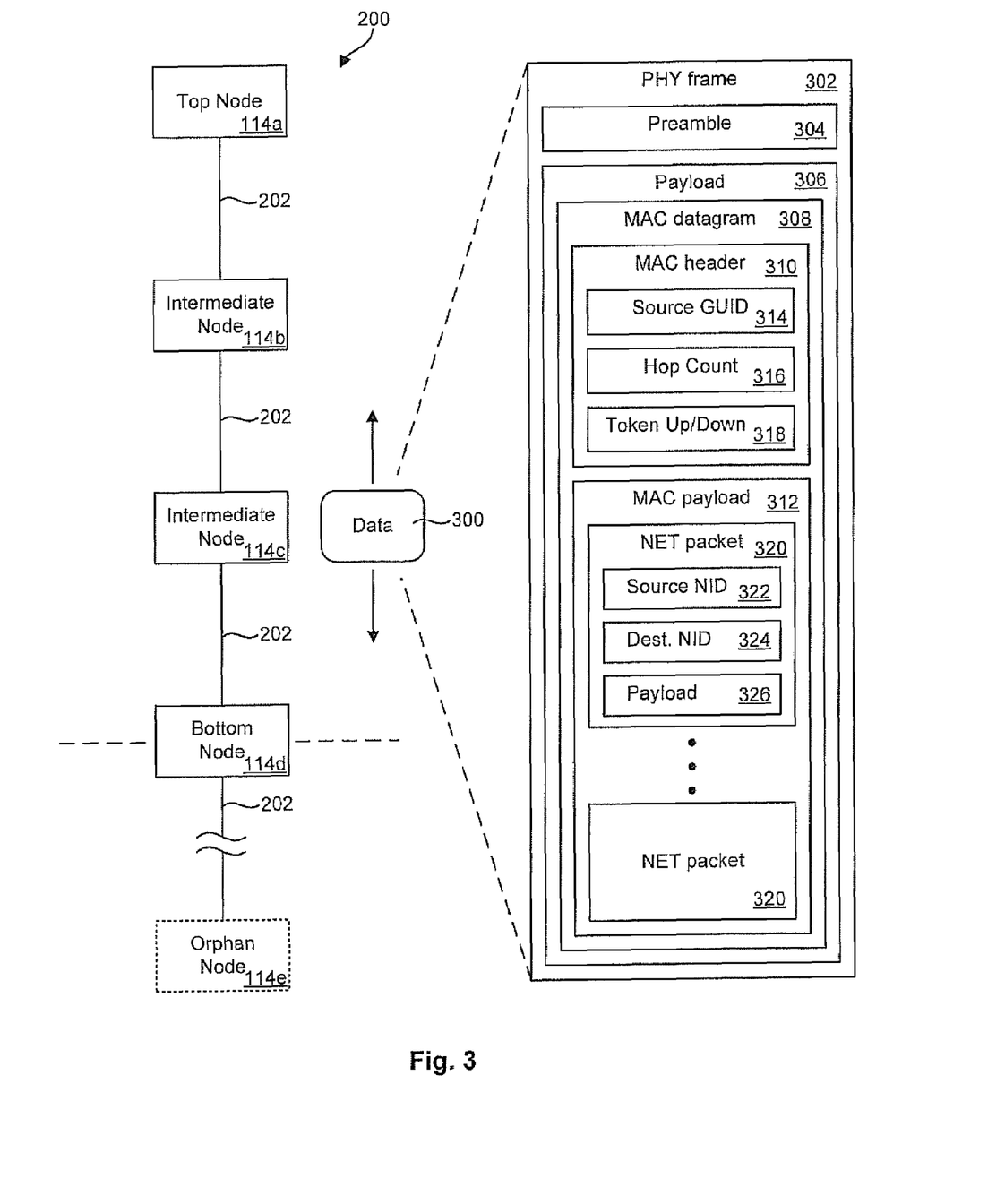
FIG. 3 is a high-level schematic block diagram of one embodiment of a data format for transmitting data between network nodes.

Referring to FIG. 3, in selected embodiments, data 300 transmitted across the network 200 may be formatted to take advantage of the downhole network's topology and improve data transmission rates. Because, the network 200 is configured to function as a logical bus, data 300 is ideally transmitted across the nodes 114a-d with as little delay as possible. That is, data 300 is ideally present on all network segments 202 as simultaneously as possible and as if all segments 202 were part of the same physical bus. In reality, some delay is unavoidable when transmitting data 300 across each of the nodes 114a-d. However, the nodes 114a-d and format of the data 300 may be designed to minimize the delay, as will be explained hereafter. As a result, the data 300 may be treated as if it exists on all network segments 202 at roughly the same time.

In selected embodiments, the data 300 may transmitted between each node 114a-d after being encapsulated in a physical layer (PHY) frame 302, which may include a frame preamble 304 and payload 306. The frame payload 306 may contain a media access layer (MAC) datagram 308, or packet 308, which may include a header 310 and payload 312. The MAC header 310 may contain, among other data, a globally unique identifier (GUID) 314 identifying a source node 114a-d where the MAC datagram 308 originated. In selected embodiments, each node 114a-d may be assigned a GUID which, like a MAC address from the Ethernet specification, may uniquely identify a node 114a-d from other nodes 114a-d, whether part of the network 200 or a different network.

In selected embodiments, a destination GUID may be omitted from the MAC header 310 to shorten the MAC header 310. Because the network 200 is configured to function as a logical bus, all nodes 114a-d may "see," or receive, all data packets 308 that are transmitted across the network 200. Thus, a destination GUID may be unnecessary and may be omitted to conserve network bandwidth and improve data transmission rates.

In selected embodiments, error-detection information (e.g., CRCs, checksums, etc.) may also be omitted from the MAC header 310 (or trailer) in order to conserve bandwidth and improve data transmission rates. To make the network 200 function as a logical bus, the intermediate nodes 114b, 114c may be configured to forward a data frame 302 to an adjacent node 114a-d before the entire frame 302 has been received. In selected embodiments, the intermediate nodes 114b, 114c may receive just enough data to verify that it is receiving a data frame 302 (as opposed to just hearing noise) and modify one or more bits in the MAC header 310 (e.g., hop count 316, token up/down 318, etc.) before it forwards the frame 302 to the next node 114a-d. This reduces latency through the nodes 114b, 114c and makes the network segments 202 perform more like a single physical bus. Error-checking information may be omitted from the MAC header 310 (or trailer) to reduce the header size and reduce transmission latency. Instead, error-checking may be performed at a higher layer of the network 200.

When forwarding the frame 302, the nodes 114b, 114c may store a copy of the frame 302. As will be explained more fully hereafter, this enables nodes 114a-d to later determine if they are intended recipients of data contained within a frame 302.

The MAC header 310 may also contain a hop count 316 which may be incremented each time a frame 302 passes through a node 114b, 114c. In addition to identifying the number of hops made by a datagram 308, the hop count may provide a useful tool to monitor the topology of the network 200 (i.e., the physically-segmented logical token bus network 200) described in association with FIGS. 2 and 3. This is true because there is only a single route through the network 200. Thus, unlike many conventional networks where data may traverse several different routes, all data packets traverse the same route through the network 200. As a result, the hop count 316 (in addition to a unique identifier (e.g., the GUID 314) and a direction identifier which will be explained in more detail hereafter) may provide sufficient information to track the position and movement of nodes 114a-d within the network 200. This concept will become more evident and will be explained in more detail in association with FIGS. 4 through 9.

In selected embodiments, the down token 204a and up token 204b described in FIG. 2 may be represented by several bits 318 in the MAC header 310. For example, a first bit may be reserved for the down token 204 and a second bit may be reserved for the up token 204b. Only one bit can be set in the header 310. If both bits are set, the MAC datagram 308 may be discarded. A node 114a-d may claim a token by removing it from a received MAC datagram 308. Similarly, the node 114a-d may transmit the token to another node 114a-d by asserting the bit in a subsequent MAC datagram 308. In this way, the down token 204a and up token 204b may be integrated into the packet structure.

The MAC payload 312 may contain one or more network layer (NET) packets 320. These packets 320 may contain, among other information, a header containing a source network identifier (NID) 322, destination network identifier (NID) 324, and a payload 326. The network identifiers 322, 324 may be network-layer logical addresses assigned to each of the nodes 114a-d which map to the nodes' globally unique identifiers (GUIDs) described above. The network identifiers 322, 324, however, may be shorter than the GUIDs to shorten the NET packets 320 and conserve bandwidth. For example, eight bits may be reserved for the network identifiers 322, 324 whereas thirty-two bits may be reserved for the globally unique identifier 314. The eight-bit network identifiers 322, 324 provide for up to 256 uniquely named nodes 114a-d within a downhole network 200.

As mentioned, the nodes 114a-d may store a copy of each frame 302 that is forwarded through the network 200. Using this copy, the nodes 114a-d may strip away outer layer headers and trailers to extract the NET packets 320. A node 114a-d may then compare the destination network identifier 324 of each packet 320 to its own network identifier to determine if the node 114a-d is the intended destination for the packet 320. If the identifiers match, the node 114a-d may extract and use the packet payload data 326. If the identifiers do not match, the node 114a-d may discard the packet 320.

In selected embodiments, the NET packets 320 may include error-detection information (e.g., CRCs, checksums, etc.) to detect errors in the packets 320. The nodes 114a-d may use this information to check for errors in the packets 320. If errors are found, the nodes 114a-d may discard the packets 320. By performing error-checking procedures within the node 114a-d after a frame 302 has been forwarded through the network 200, packet integrity may be checked without slowing down the network 200 and delaying data transmission.

Figure 4:
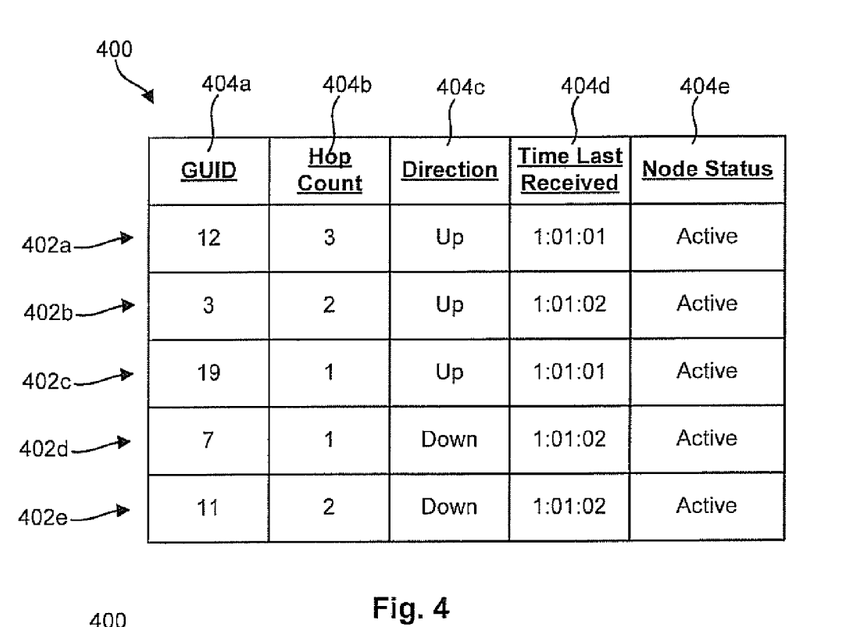
FIG. 4 is a diagram showing one embodiment of a network topology table in accordance with the invention.

Referring to FIG. 4, in certain embodiments, a network topology table 400 may be maintained to discover and monitor the topology of the downhole network 200. The table 400 may be generated and maintained locally by any of the nodes 114 of the network 200 to track and monitor the network topology. In selected embodiments, the table 400 may provide up-to-date information with respect to each of the downhole nodes 114, their location within the network 200, and their operational status. In selected embodiments, the table 400 may be generated and maintained at a single node, such as the top node 114a. This table 400 may then be accessed by the top node 114a as well as other downhole nodes 114b-e through the network 200. In other embodiments, the table 400 may be generated and maintained locally by selected downhole nodes 114b-e to track the position and operational status of other nodes 114a-e.

For example, in one embodiment, a topology table 400 in accordance with the invention may include multiple entries 402a-e, or records 402a-e, each representing a different node 114a-e in the downhole network 200. In selected embodiments, each entry 402a-e may include fields to store a GUID 404a associated with a node 114a-e, a hop count 404b, a direction identifier 404c indicating the direction packets are received from a node 114a-e, a timestamp 404d indicating when a packet was last received from a node 114a-e, and a node status indicator 404e identifying the most recent operational status of the node 114a-e. These fields 404a-e are exemplary in nature and do not represent an exhaustive list of all fields 404a-e that may be included in a topology table 400. Thus, additional fields (e.g., a logical network identifier (NID), etc.) may be added to or subtracted from the table 400 as needed.

In certain embodiments, the entries 402a-e may be created and populated with data by monitoring and extracting data from packets 308 received by each node 114 during normal operation of the network 200. That is, the GUIDs 314 and associated hop counts 316 may be extracted from data packets 308 received by each node 114 without creating additional traffic on the network 200. A timestamp 404d may be recorded each time a packet 308 is received from a particular node 114a-e. Using this information, an operational status 404e may be determined for each node 114a-e of the network 200.

In the event some nodes 114a-e infrequently transmit data packets 308 through the network 200, the nodes 114a-e may also be configured to periodically (e.g., every 10 seconds) transmit a packet 308 through the network 200. This will ensure that packets are periodically received from each node 114a-d to maintain an updated table 400. In other embodiments, one or more of the nodes 114a-d may be configured to send a query to other nodes 114a-d to request a data packet. These nodes 114a-d may respond to the query by transmitting a data packet 308 providing their GUIDs 314 and hop counts 316. In the event a node 114a-d does not respond, the status 404e of the node 114a-d may be changed as will be explained in more detail hereafter.

In yet other embodiments, the nodes 114a-d may be configured to transmit a packet 308 along the network 200 each time an event occurs, such as a state change. For example, a node 114a-d may transmit a packet 308 along the network 200 if it transitions from an orphan node to a bottom node, from a bottom node to an intermediate node, or the like. These events may be associated with a change in network topology, and the packets 308 may be sent to ensure that changes are reflected in the table 400.

Because each GUID is unique, the GUID values 404a may provide a primary key for the table 400. The hop count 404b and direction identifier 404c together should also be unique since no two nodes 114a-e can simultaneously occupy the same place in the network 200. In the event two entries 402a-e have the same hop count 404b and direction identifier 404c, one of several actions may be taken to resolve the conflict. For example, as will be explained in more detail in association with FIG. 8, the actions may include removing an older entry 402 from the topology table 400 or modifying a status indicator 404e of an older entry 402.

A status indicator 404e may be used to provide an operational status for each of the nodes 114a-e. In general, the status column 404e may indicate whether a node 114a-e is active or inactive. An active node may be one that is functioning and connected to the network 200. An inactive node may be one that is malfunctioning or has been disconnected from the network 200. In certain cases, a malfunctioning or disconnected node 114a-e may cause all nodes 114a-e below it to also become inactive.

Various status indicators 404e may be used indicate the status of a node 114a-e, including but not limited to "active," "inactive," "up," "down," "disconnected," "unknown," "replaced," or the like. In certain cases, a status indicator 404e may also indicate whether a status is expected or unexpected (e.g., inactive (expected) or inactive (unexpected)). For example, nodes 114a-e may be expected to be "inactive" when a connection is broken to trip the drill string 102 or add, remove, or replace nodes 114a-e, but may be unexpected to be "inactive" when a break or malfunction occurs downhole. For the purpose of this specification, the status indicators "active," "inactive (expected)", "inactive (unexpected)," and "unknown" will be used to indicate the status of downhole nodes 114a-e.

Figure 5:
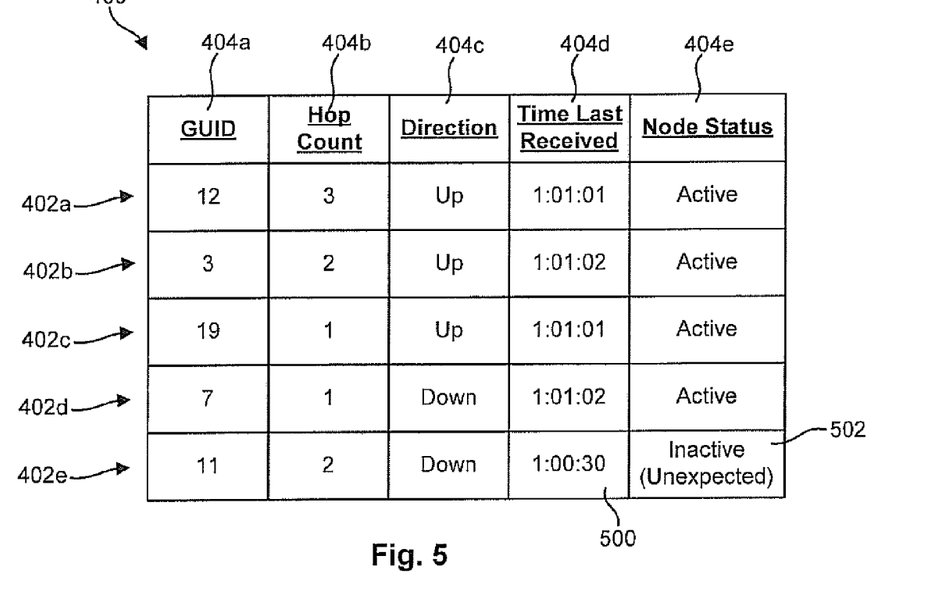
FIG. 5 is a diagram showing one embodiment of a network topology table showing a change of operating status for one of the entries.

Referring to FIG. 5, in selected embodiments, the status 404e of nodes 114a-e may change if a packet 308 is not received within a certain period of time (e.g., 30 seconds). If a packet is not received within this time period, this may indicate that a connection has been lost with a node 114a-e or that a node 114a-e has stopped operating. In selected embodiments, the time period may be calculated by comparing a node's timestamp 500 with a current time. If the timestamp 500 reaches a certain age before an entry 402e is updated, the status indicator 502 of a node 114a-e may be changed to reflect an inactive status, such as "inactive (unexpected)," if the inactivity of the node was unexpected.

Figure 6:
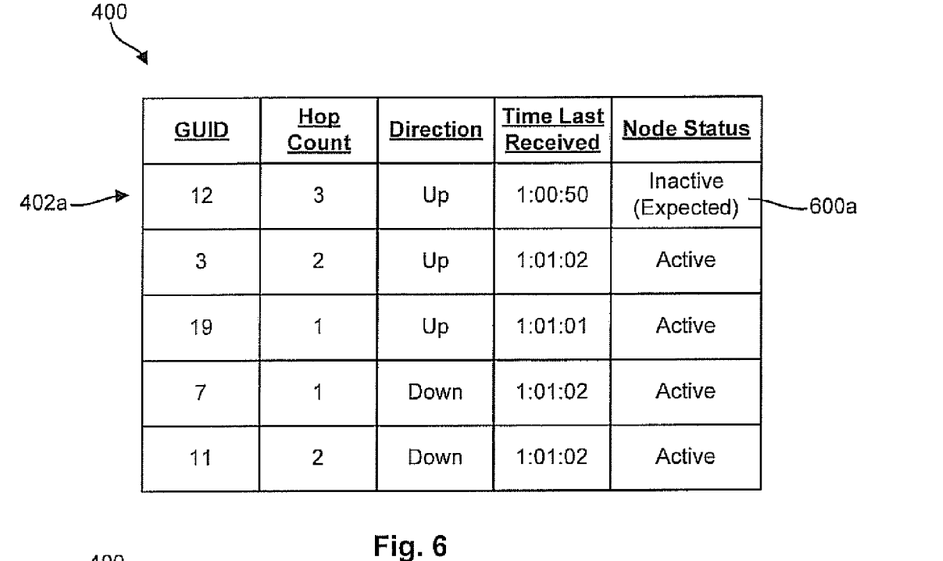
FIG. 6 is a diagram showing one embodiment of a network topology table showing operating status changes for other entries.

Referring to FIG. 6, in other cases, the inactivity of one or more nodes 114a-e may be expected. For example, some nodes 114a-e may become inactive when they or other nodes 114a-e are replaced, added, or subtracted from the drill string 102. During these events, it may be necessary to break the connection between a top node 114a and nodes positioned along the drill string 102. If the nodes 114b-e become inactive in a situation that is expected, a status indicator 600a for each of these nodes 114b-e may be changed to reflect in inactive status, such as "inactive (expected)." In selected embodiments, higher-level intelligence, operator input, or other external inputs may be used to determine if node inactivity is "expected" or "unexpected."

Figure 7A:
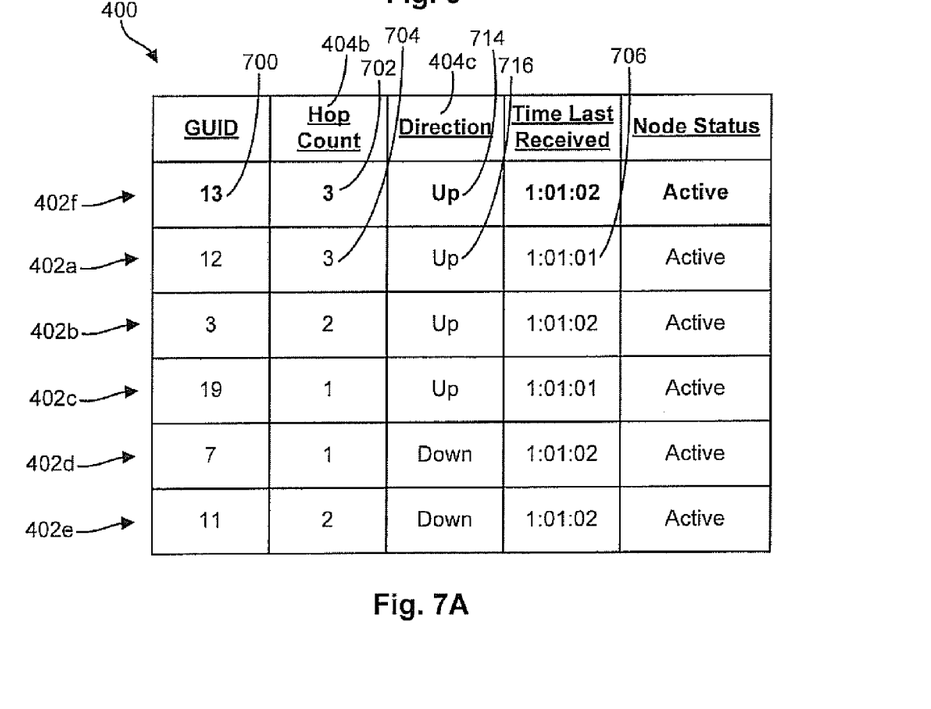
FIG. 7A is a diagram showing one embodiment of a network topology table showing two entries with conflicting hop counts and direction identifiers.

Referring to FIG. 7A, as mentioned, the hop count 404b and direction identifier 404c together should be unique for each node 114a-e since the nodes 114a-e are positioned serially along the drill string 102. The hop count 404b and direction identifier 404c may be used to determine the position and order of each node 114a-e within the network 200. In selected embodiments, the entries 402a-e may be organized according to their hop count 404b and direction identifier 404c to show the order and position of nodes 114a-e within the network 200.

In certain cases, it may be possible for two or more entries 402 to have the same hop count 404b and direction identifier 404c, at least for a brief period of time. For example, a data packet 308 may be received which identifies a new GUID 700 having a hop count 702 and direction identifier 714 that matches the hop count 704 and direction identifier 716 of another entry 402a. The new GUID 700 may be used to create a new entry 402f in the table 400. The conflict described above may occur for various reasons. For example, the node 114a-e represented by the entry 402a may have been replaced by a node 114a-e represented by the entry 402f. Alternatively, the node 114a-e represented by the entry 402a may have shifted down the drill string 102 because a node 114a-e was added to the drill string 102. In either case, corrective action may be taken to modify the entry 402a having the older timestamp 706.

Figure 7B:
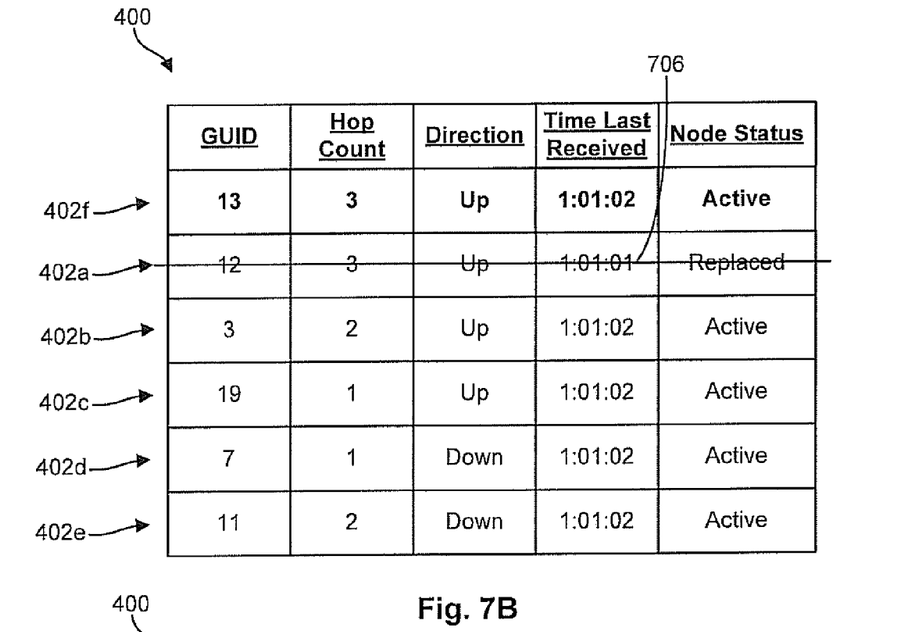
FIG. 7B is a diagram showing one embodiment of a network topology table showing the removal of an entry to resolve a hop count and direction identifier conflict.

Referring to FIG. 7B, for example, if the node 114a-e represented by the older timestamp 706 has been replaced, the entry 402a may be deleted from the table 400.

Figure 7C:
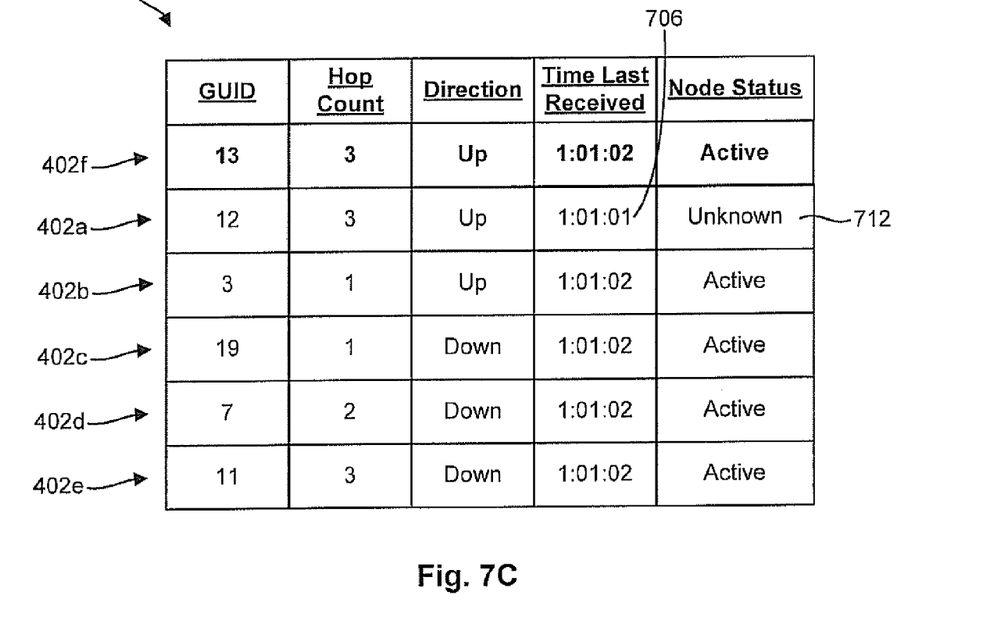
FIG. 7C is a diagram showing one embodiment of a network topology table showing a status change to resolve conflicting hop counts and direction identifiers.

Referring to FIG. 7C, conversely, if the position of the node 114a-e represented by the older timestamp 706 has shifted up or down the drill string 102, the status 712 of the entry 402a may be changed from "active" to "unknown" to reflect that its status is currently unknown. When a packet 308 is eventually received from this node 114a-e, the hop count 404b and direction identifier 404c may be updated and the status indictor 712 may be changed back to "active."

Figure 8:
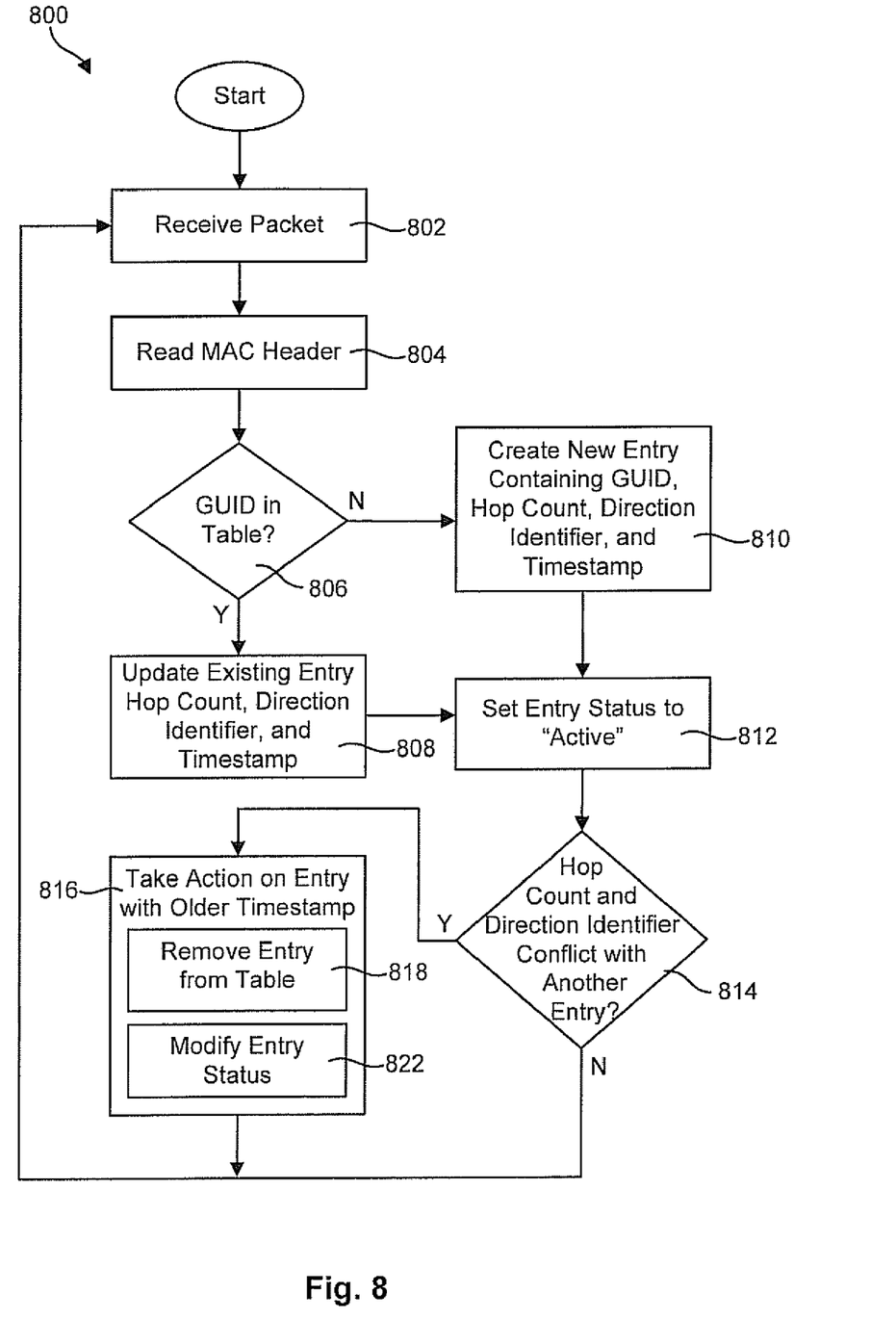
FIG. 8 is a flow chart illustrating one embodiment of a method for generating and maintaining a network topology table in accordance with the invention.

Referring to FIG. 8, in selected embodiments, a method 800 to generate and maintain a topology table 400 in accordance with the invention may include receiving 802 a packet and reading 804 a header (e.g., a MAC header) to extract a GUID and hop count from the header. A direction identifier may be determined by observing whether the packet was received from an "up" or "down" direction. If, at a decision step 806, the GUID is already represented by an entry in the table 400, the method 800 may include updating 808 the hop count, direction identifier, and timestamp of the entry containing the GUID and setting 812 the status of the entry to "active." If, on the other hand, the GUID is not represented in the table 400, the method 800 may include creating 810 a new entry containing the GUID, hop count, direction identifier, and timestamp, and setting 812 the status of the entry to "active."

At this point, the method 800 may check, at a decision step 814, whether the hop count and direction identifier of the newly created or updated entry conflicts with the hop count of another entry. If a conflict exists, the method 800 may include taking 816 corrective action on the entry with the older timestamp. For example, if a node 114*a-e* represented by the entry has been replaced, the action may include removing 818 the entry from the topology table. If, on the other hand, the node has simply shifted up or down the drill string 102 as other nodes are added or removed from the network 200, the action may include changing 822 the status indicator of the entry to "unknown," "inactive," or the like until more information is known about the node.

Once the conflict is resolved, the method 800 may receive 802 and read 804 the header of the next packet to restart the process. In this way, the method 800 may be used to create and maintain an updated network topology table 400.

Figure 9:
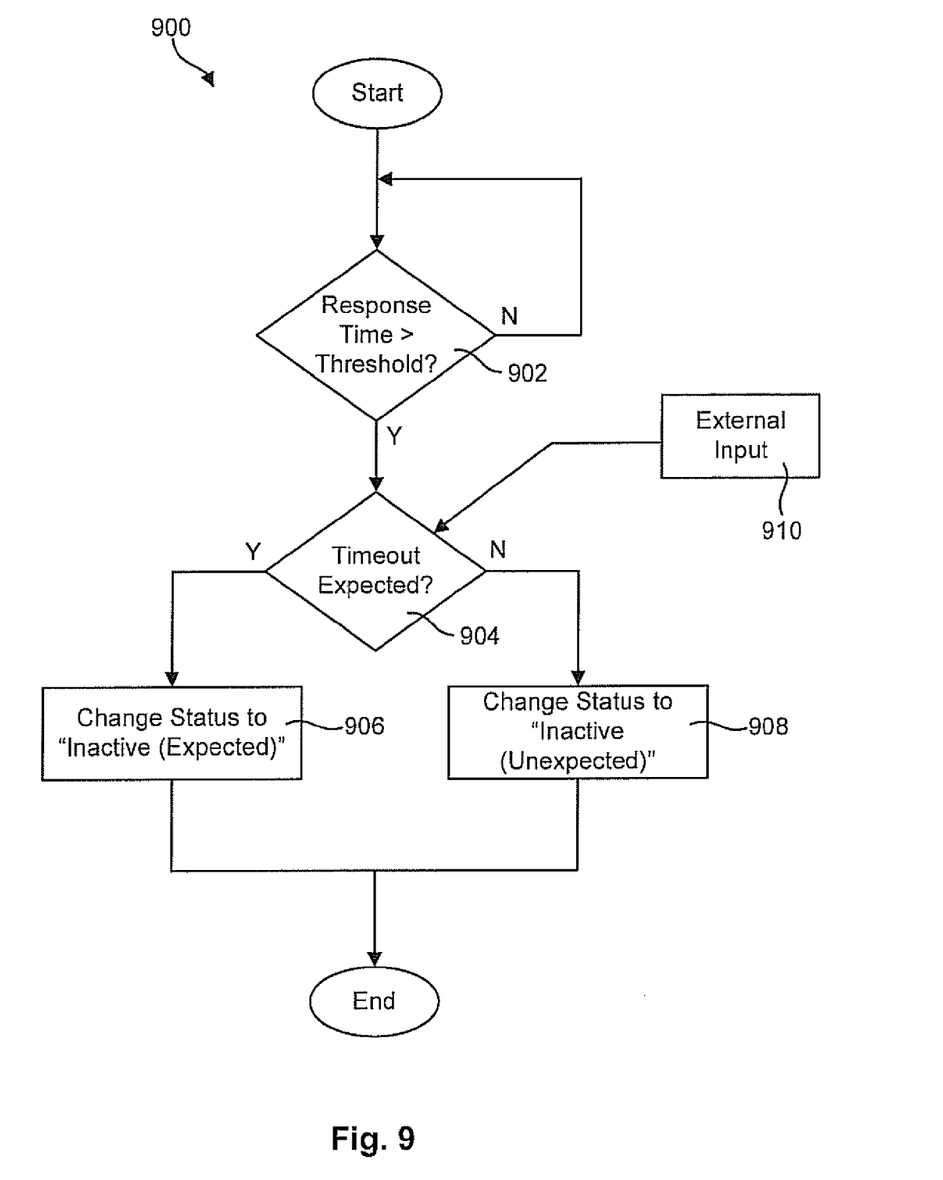
FIG. 9 is a flow chart illustrating one embodiment of a method for modifying the operating status indicators of downhole nodes.

Referring to FIG. 9, one embodiment of a method 900 for modifying the status of downhole nodes 114*a-e* may include determining, at a decision step 902, if the response time of a node 114*a-e* has exceeded a selected threshold. As mentioned previously, this step 902 may include comparing the timestamps corresponding to each node 114*a-e* to the current time. If the timestamps have reached a certain age, then the threshold has been reached and the method 900 may move to a next decision step 904.

If, at the decision step 904, the timeout was expected, the method may include changing 906 the status of the node to "inactive (expected)." If, on the other hand, the timeout was not expected, the method 900 may include changing 908 the status of the node 114*a-e* to "inactive (unexpected)." As will be explained more fully in association with FIG. 10, an external input 910 may be used to determine whether node inactivity is expected or unexpected.

Figure 10:
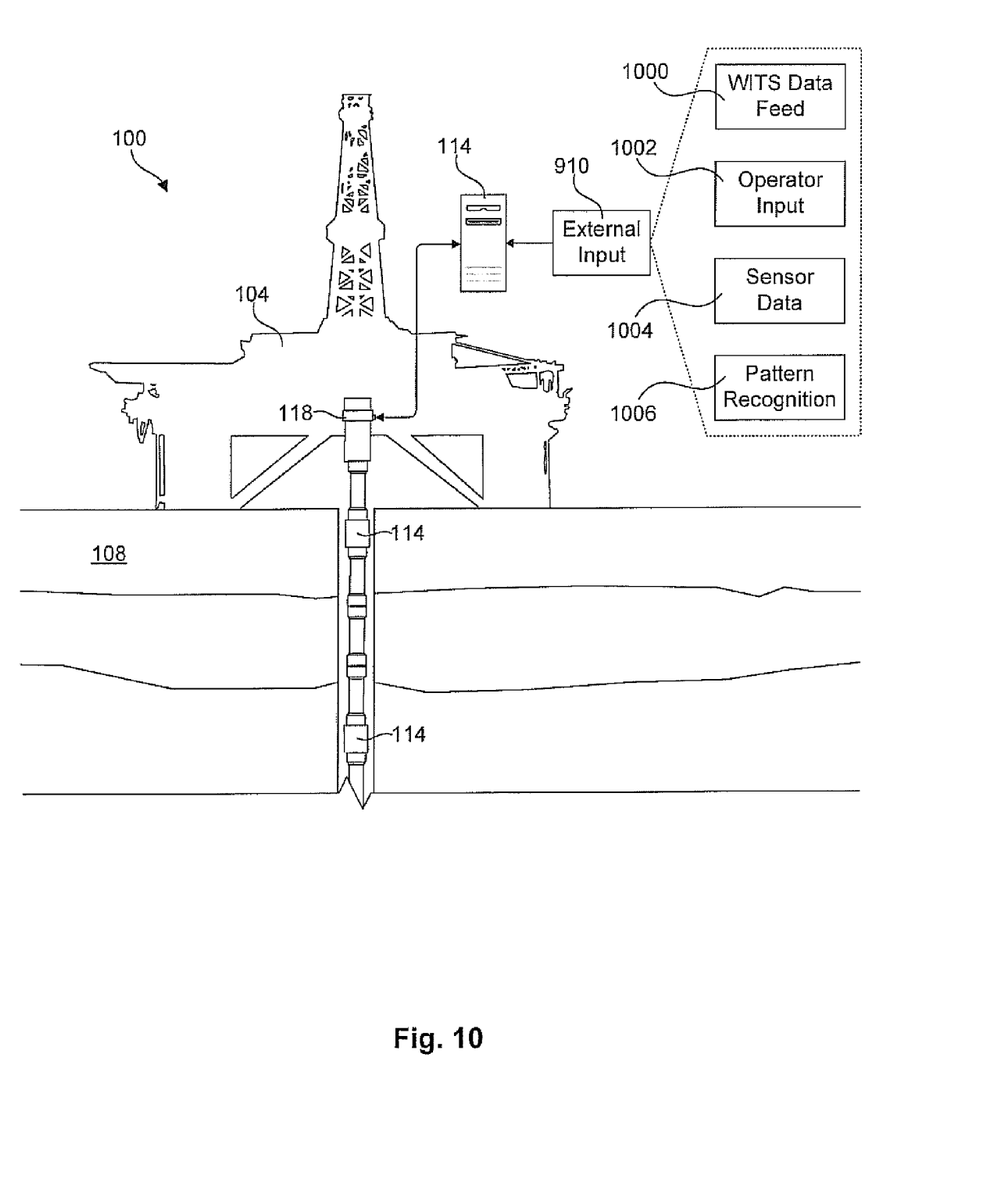
FIG. 10 is a high-level profile view of one embodiment of a downhole network utilizing an external input to aid in determining whether node inactivity is expected or unexpected.

Referring to FIG. 10, as mentioned previously, the topology table 400 may include status indicators 404*e* to indicate whether node inactivity is "expected" or "unexpected." This information may be useful to drilling operators or other personnel because a different response may be needed if node inactivity is expected, as opposed to unexpected. For example, unexpected node inactivity may indicate that there is a problem, dangerous condition, break, or malfunction downhole that may require an immediate response. Expected node inactivity, on the other hand, may require a less urgent response or no response at all.

Information related to whether node inactivity is expected or unexpected may be useful when conducting automated drilling operations. For example, downhole tools such as directional-drilling or seismic tools may be temporarily shut down or halted when network nodes 114 become inactive or it is anticipated they will become inactive. Consequently, node status information may be useful or even essential when using the network 200 to conduct automated drilling operations.

As discussed in association with FIG. 9, an external input 910 may be used to provide surface information to determine whether node inactivity is expected or unexpected. For example, in one embodiment, an external input 910 may include a Wellsite Information Transfer Specification (WITS) data feed 1000. The WITS data feed 1000 may provide information such as block position, pump pressure, pump stroke rate, mud flow rate, bit rotary speed, drill string rotary speed, weight-on-bit, as well as many other types of information, which may be used to determine or anticipate whether node inactivity is expected or unexpected.

In other embodiments, the external input 910 may include input 1002 from an operator or data 1004 gathered from one or more surface sensors. In yet other embodiments, a node may learn to recognize patterns 1006 to predict whether node inactivity is expected or unexpected. For example, certain criteria such as mud flow rate, drill string rotary speed, or the like, may exhibit a pattern before certain events (e.g., tripping the drilling string, inserting a stand, etc.) occur and may be used to anticipate whether an inactive condition is expected or unexpected. In short, various types of external input 910 may be used by the topology table 400 to ascertain whether node inactivity is expected or unexpected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to discover and monitor a collection of nodes in a downhole network, the downhole network comprising a plurality of downhole nodes positioned along a drill string, including at least a first downhole node and a second downhole node, the method comprising:

receiving a first data packet originating from the first downhole node from a first direction;

reading, from the first packet, a first unique identifier and a first hop count associated with the first downhole node;

creating a first entry in a network topology table corresponding to the first downhole node and storing the first unique identifier, first hop count, and first direction;

receiving, after the first data packet, a second data packet originating from the second downhole node from a second direction;

reading, from the second packet, a second unique identifier and a second hop count associated with the second downhole node;

creating a second entry in the network topology table corresponding to the second downhole node and storing the second unique identifier, second hop count, and second direction; and modifying the first entry in the event the second hop count matches the first hop count and the second direction matches the first direction.

2. The method of claim 1, wherein modifying the first entry comprises deleting the first entry from the network topology table.

3. The method of claim 1, further comprising storing a status indicator for each of the first and second entries, each status indicator indicating an operating status of the first and second nodes, respectively.

4. The method of claim 3, wherein modifying the first entry comprises modifying the status indicator of the first entry.

5. The method of claim 3, wherein the status indicator designates that a node is at least one of active and inactive.

6. The method of claim 3, wherein the status indicator designates that a node's operating status is at least one of expected and unexpected.

7. The method of claim 3, further comprising storing a timestamp for each of the first and second entries, each timestamp indicating the last time a data packet was received from the first and second nodes, respectively.

8. The method of claim 7, further comprising modifying a status indicator in the event the age of a corresponding timestamp exceeds a selected threshold.

9. The method of claim 1, wherein the first and second unique identifiers are globally unique.

10. The method of claim 1, wherein the first and second unique identifiers are unique within a downhole network.

11. A non-transitory computer-readable medium storing a program of computer-executable instructions to perform operations to discover and monitor a collection of nodes in a downhole network, the downhole network comprising a plurality of downhole nodes positioned along a drill string, including at least a first downhole node and a second downhole node, the operations comprising:
  receiving a first data packet originating from the first downhole node from a first direction;
  reading, from the first packet, a first unique identifier and a first hop count associated with the first downhole node;
  creating a first entry in a network topology table corresponding to the first downhole node and storing the first unique identifier, first hop count, and first direction;
  receiving, after the first data packet, a second data packet originating from the second downhole node from a second direction;
  reading, from the second packet, a second unique identifier and a second hop count associated with the second downhole node;
  creating a second entry in the network topology table corresponding to the second downhole node and storing the second unique identifier, second hop count, and second direction; and
  modifying the first entry in the event the second hop count matches the first hop count and the second direction matches the first direction.

12. The computer-readable medium of claim 11, wherein modifying the first entry comprises deleting the first entry from the network topology table.

13. The computer-readable medium of claim 11, further comprising storing a status indicator for each of the first and second entries, each status indicator indicating an operating status of the first and second nodes, respectively.

14. The computer-readable medium of claim 13, wherein modifying the first entry comprises modifying the status indicator of the first entry.

15. The computer-readable medium of claim 13, wherein the status indicator designates that a node is at least one of active and inactive.

16. The computer-readable medium of claim 13, wherein the status indicator designates that a node's operating status is at least one of expected or unexpected.

17. The computer-readable medium of claim 13, further comprising storing a timestamp for each of the first and second entries, each timestamp indicating the last time a data packet was received from the first and second nodes, respectively.

18. The computer-readable medium of claim 17, further comprising modifying a status indicator in the event the age of a corresponding timestamp exceeds a selected threshold.

19. The computer-readable medium of claim 11, wherein the first and second unique identifiers are at least one of globally unique and unique within a downhole network.

20. An apparatus to discover and monitor a collection of nodes in a downhole network, the apparatus comprising a non-transitory machine-readable medium storing a program of computer-executable instructions and executable and operational data structures, wherein the instructions are configured to perform operations to discover and monitor a plurality of downhole nodes positioned along a drill string by creating and maintaining the data structures, the data structures comprising:
  a network topology table maintained to monitor the plurality of downhole nodes in a downhole network, the network topology table comprising a plurality of entries, each entry storing a unique identifier, hop count, and direction identifier associated with a downhole node; and
  the network topology table being further configured such that no two entries, representing active downhole nodes, have the same hop count and direction identifier.

21. The apparatus of claim 20, each entry further configured to store a status indicator identifying an operating status of each node.

22. The apparatus of claim 21, wherein the status indicator designates that a node is at least one of active and inactive.

23. The apparatus of claim 21, wherein the status indicator designates that a node's operating status is at least one of expected or unexpected.

24. The apparatus of claim 20, each entry further configured to store a timestamp indicating the last time a data packet was received from a node.

25. The apparatus of claim 20, wherein the unique identifier is at least one of globally unique and unique within the downhole network.

* * * * *